United States Patent
Boulet

(10) Patent No.: US 9,884,282 B2
(45) Date of Patent: *Feb. 6, 2018

(54) SYSTEM AND METHOD FOR INTEGRATED ADSORPTIVE GAS SEPARATION OF COMBUSTION GASES

(71) Applicant: INVENTYS THERMAL TECHNOLOGIES INC., Burnaby (CA)

(72) Inventor: Andre Boulet, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/845,764

(22) Filed: Sep. 4, 2015

(65) Prior Publication Data

US 2015/0375161 A1 Dec. 31, 2015

Related U.S. Application Data

(63) Continuation of application No. 14/128,595, filed as application No. PCT/CA2012/050451 on Jun. 29, 2012, now Pat. No. 9,146,035.

(Continued)

(51) Int. Cl.
  *B01D 53/04* (2006.01)
  *B01D 53/62* (2006.01)
  (Continued)

(52) U.S. Cl.
  CPC ....... *B01D 53/0462* (2013.01); *B01D 53/047* (2013.01); *B01D 53/62* (2013.01);
  (Continued)

(58) Field of Classification Search
  CPC .. B01D 53/04; B01D 53/0462; B01D 53/047; B01D 53/62; B01D 2253/102; B01D 2253/106; B01D 2253/108; B01D 2253/1124; B01D 2253/1128; B01D 2253/116; B01D 2253/204; B01D 2253/25; B01D 2257/504; B01D 2258/0283; B01D 2259/40001; B01D 2259/45; F01K 17/04;
  (Continued)

(56) References Cited

U.S. PATENT DOCUMENTS

| | | | |
|---|---|---|---|
| 8,535,417 B2* | 9/2013 | Shah | B01D 53/002 95/103 |
| 2011/0139046 A1* | 6/2011 | Fan | F23C 9/00 110/204 |
| 2014/0105809 A1* | 4/2014 | Okumura | B01D 53/04 423/437.1 |

* cited by examiner

Primary Examiner — Frank Lawrence
(74) Attorney, Agent, or Firm — Palmer IP Inc.

(57) ABSTRACT

An integrated fuel combustion system with adsorptive gas separation separates a portion of carbon dioxide from a combustion gas mixture and provides for recycle of separated carbon dioxide to the intake of the fuel combustor for combustion. A process for carbon dioxide separation and recycle includes: admitting combustion gas to an adsorptive gas separation system contactor containing adsorbent material; adsorbing a portion of carbon dioxide; recovering a first product gas depleted in carbon dioxide for release or use; desorbing carbon dioxide from the adsorbent material and recovering a desorbed second product gas enriched in carbon dioxide for sequestration or use; admitting a conditioning fluid into the contactor and desorbing a second portion of carbon dioxide to recover a carbon dioxide enriched conditioning stream; and recycling a portion of the carbon dioxide enriched conditioning stream to an inlet of fuel combustor to pass through the fuel combustor for combustion.

20 Claims, 4 Drawing Sheets

Related U.S. Application Data

(60) Provisional application No. 61/504,197, filed on Jul. 2, 2011.

(51) Int. Cl.

| | | |
|---|---|---|
| *B01D 53/047* | (2006.01) | |
| *F01K 17/04* | (2006.01) | |
| *F01K 23/10* | (2006.01) | |
| *F23J 15/02* | (2006.01) | |
| *F23C 9/08* | (2006.01) | |
| *B01D 53/06* | (2006.01) | |

(52) U.S. Cl.
CPC .............. *F01K 17/04* (2013.01); *F01K 23/10* (2013.01); *F23C 9/08* (2013.01); *F23J 15/02* (2013.01); *B01D 53/06* (2013.01); *B01D 2253/102* (2013.01); *B01D 2253/106* (2013.01); *B01D 2253/108* (2013.01); *B01D 2253/116* (2013.01); *B01D 2253/1124* (2013.01); *B01D 2253/1126* (2013.01); *B01D 2253/204* (2013.01); *B01D 2253/25* (2013.01); *B01D 2257/504* (2013.01); *B01D 2258/0283* (2013.01); *B01D 2259/40001* (2013.01); *B01D 2259/45* (2013.01); *F23J 2215/50* (2013.01); *F23J 2219/60* (2013.01); *Y02C 10/04* (2013.01); *Y02C 10/08* (2013.01); *Y02E 20/16* (2013.01); *Y02E 20/326* (2013.01)

(58) Field of Classification Search
CPC .... F01K 23/10; F23C 9/08; F23J 15/02; F23J 2215/50; F23J 2219/60; Y02C 10/04; Y02C 10/08; Y02E 20/16
USPC ........ 96/121, 122, 126; 95/96–99, 104, 106, 95/139; 110/203, 204, 345
See application file for complete search history.

SYSTEM AND METHOD FOR INTEGRATED ADSORPTIVE GAS SEPARATION OF COMBUSTION GASES

1. RELATED APPLICATIONS

The present application claims the benefit of U.S. Pat. No. 9,146,036, filed Dec. 21, 2013 and entitled "System and Method for Integrated Adsorptive Gas Separation of Combustion Gases"; and claims benefit of PCT International Patent Application No. PCT/CA20120/050451, filed Jun. 29, 2012 and entitled "System and Method for Integrated Adsorptive Gas Separation of Combustion Gases"; and claims benefit of U.S. Provisional Patent Application Ser. No. 61/504,197 filed Jul. 2, 2011 and entitled "System and Method for Integrated Adsorptive Gas Separation of Combustion Gases"; the contents of each of which are herein incorporated by reference in their entirety for all purposes.

The present invention is related to previously filed PCT International Patent Application No. PCT/CA2011/050521, filed Aug. 26, 2011 and entitled "Method of Adsorptive Gas Separation using Thermally Conductive Contactor Structure", the contents of which are herein incorporated by reference in their entirety. The present application is also related to previously filed PCT International Patent Application No. PCT/CA2010/000251, filed Feb. 26, 2010 and entitled "Parallel Passage Fluid Contactor Structure", the contents of which are also herein incorporated by reference in their entirety.

2. TECHNICAL FIELD

The present invention relates generally to methods for integrated adsorptive gas separation of combustion gases and systems therefore. More particularly, the present invention relates to methods of integrated adsorptive gas separation of combustion gases and recycle of separated combustion gases to a combustion process and systems incorporating the same.

3. BACKGROUND OF THE INVENTION

Temperature swing adsorption methods are known in the art for use in adsorptive separation of multi-component gas mixtures. Many conventional temperature swing adsorption processes are used for preferentially adsorbing one component of a feed gas mixture on an adsorbent material to separate it from the remaining feed gas components, and then subsequently to regenerate the adsorbent material to desorb the adsorbed component and allow for cyclic reuse of the adsorbent material. However, conventional temperature swing adsorption methods are typically limited in their efficiency due in part to limitations in the desorption or regeneration of the adsorbent material used in an adsorptive separation system, and also to limitations in the adsorption phase of the temperature swing adsorption process. Such inefficiencies in conventional temperature swing adsorption systems and methods have also led to inefficiencies in the integration of such systems into industrial systems where separation of gas mixtures may be desired, leading to undesirable costs in capital, energy and/or operating efficiency.

One type of industrial process where gas separation may be desirable includes combustion processes, where the separation of one or more gas component from a combustion process flue gas is required, such as for the removal and/or sequestration of carbon dioxide gas from fossil fuel combustion process flue gas mixtures, for example. In such applications, inefficiencies in conventional temperature swing adsorptive gas separation systems have typically led to undesireably inefficient integration of such temperature swing adsorptive gas separation systems into fossil fuel combustion processes, resulting in unacceptably high capital costs, reductions in energy efficiency and/or efficiency of gas separation, and operating costs, for example.

One inefficiency of typical conventional temperature adsorption processes in fossil fuel combustion applications is the inefficient adsorption of a desired combustion gas component on the adsorbent material, which may result from the rapid increase in temperature of the adsorption front when moving through the adsorbent material due to the heat of adsorption released as the gas component is adsorbed. In many conventional temperature swing adsorption methods, such increases in the temperature of the adsorbent material during adsorption may result in decreased adsorbent capacity associated with "hot spots" in the adsorbent material and a corresponding decrease in efficiency of the temperature swing adsorption process. Another shortcoming of typically conventional temperatures swing adsorption methods in fossil fuel combustion applications is the inefficient desorption or regeneration of the adsorbent material, which may result from the difficulty in uniformly heating the adsorbent material as thermal energy is required to meet the heat of desorption of the adsorbed compound during desorption or regeneration. Such non-uniformities in the heating of the adsorbent material may typically result in retained adsorption of a gas component associated with "cold spots" in the adsorbent material, or may require the application of an unnecessarily large thermal flux to sufficiently desorb the gas component, which may lead to undesirably high heating costs and leave the adsorbent material unnecessarily overheated following desorption, which undesirably affects continued adsorption system performance, and may typically require additional operating cost intensive remedies such as additional cooling steps in order to retain adsorptive functionality.

4. SUMMARY OF THE INVENTION

It is an object of the present invention to provide a method of integrated adsorptive gas separation for combustion gases that addresses some of the limitations of the prior art.

It is a further object of the invention to provide a method of integrated adsorptive gas separation for combustion gases using a parallel passage thermal swing adsorption (TSA) system integrated within a fossil fuel combustion system according to the present invention that addresses some of the limitations of the prior art.

It is an object of the invention to provide an integrated adsorptive gas separation for combustion gases using a parallel passage partial pressure swing adsorption (PPSA) system integrated within a fossil fuel combustion system according to the present invention that addresses some of the limitations of the prior art.

It is a further object of the invention to provide an integrated adsorptive gas separation for combustion gases using a parallel passage pressure swing adsorption (PSA) system integrated within a fossil fuel combustion system according to the present invention that addresses some of the limitations of the prior art.

It is yet a further object of the invention to provide an integrated fossil fuel combustion system including a TSA gas separation process for separating carbon dioxide from a combustion gas mixture according to the present invention that addresses some of the limitations of the prior art.

In one aspect, an integrated adsorptive gas separation process for separating at least a portion of a combustion gas mixture from a fuel combustor is provided according to an embodiment of the present invention, wherein said combustion gas mixture comprises at least a first component comprising carbon dioxide and a second component, the process comprising:

admitting said combustion gas mixture into an adsorptive gas separation system comprising at least one adsorbent material;

adsorbing at least a portion of said first component on at least one said adsorbent material;

recovering a first product gas depleted in said first component relative to said combustion gas mixture from an outlet end of said adsorbent contactor;

desorbing a first portion of said first component adsorbed on at least one said adsorbent material;

recovering a desorbed second product gas enriched in said first component from at least one of said inlet and outlet ends of said adsorptive gas separation system;

admitting a conditioning fluid into said adsorptive gas separation system and desorbing a second portion of said first component adsorbed on at least one said adsorbent material to recover a first component enriched conditioning stream; and recycling at least a portion of said first component enriched conditioning stream recovered from said adsorptive gas separation system to an air inlet of said fuel combustor to pass through said fuel combustor for combustion.

In another aspect, an integrated adsorptive gas separation system for separating at least a portion of a combustion gas mixture is provided according to an embodiment of the present invention, said combustion gas mixture comprising at least a first component comprising carbon dioxide and a second component, the system comprising:

a fuel combustor comprising a combustor air inlet, a combustion chamber and a combustion gas outlet, wherein said combustion gas comprises at least first and second components;

an adsorptive gas separator comprising an inlet and an outlet end, wherein said adsorptive gas separator is fluidly connected to said fuel combustor to receive said combustion gas as a feed gas mixture into said inlet end and to adsorb at least a portion of said first component onto at least one adsorbent material comprised in said adsorbent gas separator; and a combustion gas recycle fluid conduit which is fluidly connected to said adsorptive gas separator and to said combustor air inlet, and adapted to receive a desorbed combustion recycle gas comprising at least a portion of said first component adsorbed on said adsorbent material, and to return said desorbed combustion recycle gas to said combustor air inlet.

It is a further object of the invention to provide an integrated fossil fuel combustion system including at least one of a PPSA and a PSA gas separation process for separating carbon dioxide from a combustion gas mixture according to the present invention that addresses some of the limitations of the prior art. In one embodiment of the present invention, an integrated adsorptive gas separation process for separating at least a portion of a combustion gas mixture from a fuel combustor is provided. In such embodiment, said combustion gas mixture comprises at least carbon dioxide and nitrogen components and the process comprises the steps of:

admitting said combustion gas mixture into an adsorptive gas separation system;

admitting said combustion gas mixture into an inlet end of at least one adsorbent contactor comprising at least one adsorbent material;

adsorbing at least a portion of said carbon dioxide combustion gas component on at least one said adsorbent material;

recovering a first product gas depleted in said carbon dioxide component relative to said combustion gas mixture from an outlet end of said adsorbent contactor;

desorbing a first portion of said carbon dioxide component adsorbed on at least one said adsorbent material;

recovering a desorbed second product gas enriched in said carbon dioxide component from at least one of said inlet and outlet ends of said adsorbent contactor;

admitting a conditioning fluid into said adsorbent contactor and desorbing a second portion of said carbon dioxide component adsorbed on at least one said adsorbent material to recover a carbon dioxide enriched conditioning stream; and recycling at least a portion of said carbon dioxide enriched conditioning stream recovered from said adsorbent contactor to an air inlet of said fuel combustor to pass through said fuel combustor for combustion.

In a further embodiment of the present invention, the step of desorbing a first portion of said carbon dioxide component may comprise desorbing a first portion of said carbon dioxide component adsorbed on at least one said adsorbent material by at least one of:

thermal swing desorption by heating at least one said adsorbent material;

pressure swing desorption; and partial pressure swing desorption.

In another embodiment of the present invention, an integrated adsorptive gas separation system for separating at least a portion of a combustion gas mixture is provided. In such an embodiment, the combustion gas mixture comprises at least carbon dioxide and nitrogen components, and the adsorptive gas separation system comprises:

a fuel combustor comprising a combustor air inlet, a combustion chamber and a combustion gas outlet, wherein said combustion gas comprises at least carbon dioxide and nitrogen components;

an adsorptive gas separator comprising at least one adsorbent contactor having an inlet and an outlet end, wherein said adsorptive gas separator is fluidly connected to said fuel combustor to receive said combustion gas as a feed gas mixture into said inlet end of said at least one adsorbent contactor and to adsorb at least a portion of said carbon dioxide component onto at least one adsorbent material comprised in said adsorbent contactor; and a combustion gas recycle fluid conduit which is fluidly connected to said adsorptive gas separator and to said combustor air inlet, and adapted to receive a desorbed combustion recycle gas comprising at least a portion of said carbon dioxide component adsorbed on said adsorbent material, and to return said desorbed combustion recycle gas to said combustor feed inlet.

Further advantages of the invention will become apparent when considering the drawings in conjunction with the detailed description.

5. BRIEF DESCRIPTION OF THE DRAWINGS

The systems and methods for integrated adsorptive gas separation of combustion gases according to embodiments of the present invention will now be described with reference to the accompanying drawing figures, in which.

Like reference numerals refer to corresponding parts throughout the several views of the drawings.

6. DETAILED DESCRIPTION OF THE INVENTION

Figure 1:
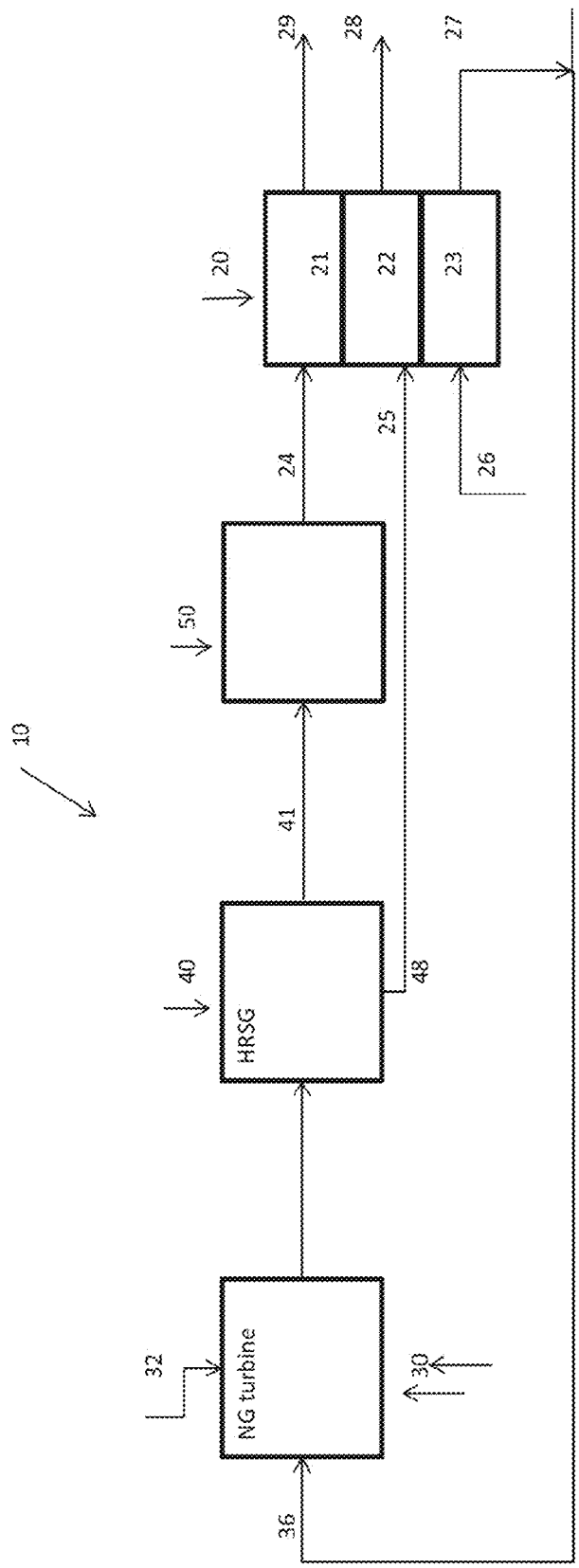
FIG. 1 illustrates a schematic view of an integrated adsorptive gas separation system for separation of combustion gases from a gas turbine for use in accordance with an embodiment of the present invention.

In one embodiment of the present invention, an integrated adsorptive gas separation process is provided for separating at least a portion of a combustion gas mixture from a fuel combustor, wherein the combustion gas mixture comprises at least carbon dioxide and nitrogen components. In one such embodiment, the adsorptive gas separation process may comprise a thermal swing adsorption (hereinafter "TSA") process, wherein at least one desorption step for desorption of a combustion gas component adsorbed on an adsorbent material is driven primarily by thermal heating of the adsorbent material, although secondary desorptive mechanisms such as purge or displacement purge with a purge fluid may also be used in desorption of adsorbed components. In another such embodiment, the adsorptive gas separation process may comprise a pressure swing adsorption (hereinafter "PSA") process, wherein at least one desorption step for desorption of a combustion gas component adsorbed on an adsorbent material is driven primarily by a swing in pressure of the adsorbent contactor comprising the adsorbent material, although secondary adsorptive mechanisms such as purge or displacement purge with a purge fluid, or thermal heating of the adsorbent material may also be used in desorption of adsorbed combustion gas components, for example. In yet another such embodiment, the adsorptive gas separation process may comprise a partial pressure swing adsorption (hereinafter "PPSA") process, wherein at least one desorption step for desorption of a combustion gas component adsorbed on an adsorbent material is driven primarily by a swing or difference in partial pressure or concentration of at least one adsorptive gas component in the adsorbent contactor comprising the adsorbent material, although secondary adsorptive mechanisms such as thermal heating of the adsorbent material or pressure swing may also be used in desorption of adsorbed combustion gas components, for example.

In one embodiment according to the present invention, the fuel combustor may comprise any suitable type of fuel combustion device which uses primarily ambient air as a source of combustion air, such as but not limited to gaseous fuel, liquid fuel and/or solid fuel combustors. In a particular embodiment, the fuel combustor may comprise at least one of: a gas turbine combustor, combined cycle gas turbine combustor, liquid-fuel (such as oil/kerosene/diesel and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example.

In one embodiment, the integrated adsorptive gas separation process may comprise an initial step of admitting the combustion gas mixture from a fuel combustor and comprising at least carbon dioxide and nitrogen components, as a feed mixture, into an adsorptive gas separation system. The combustion gas mixture may then be admitted into the inlet end of at least one adsorbent contactor comprising at least one adsorbent material. The process may then comprise adsorbing at least a portion of the carbon dioxide combustion gas component on the adsorbent material. Following adsorption, a first product gas depleted in said carbon dioxide gas component relative to the feed mixture may be recovered from an outlet end of the adsorbent contactor. In a preferred embodiment, the adsorption step may desirably result in substantially all of the carbon dioxide combustion gas component of the combustion gas being adsorbed on the adsorbent material in the adsorptive gas separation system, so that the first product gas recovered from the adsorbent contactor may desirably be substantially free of carbon dioxide. In one such embodiment, the at least substantially complete removal of carbon dioxide from the combustion gas mixture may be desirable to allow the first product gas to be released as a flue gas into the environment substantially free of carbon dioxide, such as to reduce carbon emissions from the operation of the fuel combustor. In a particular such embodiment, the first product gas may desirably have a carbon dioxide concentration that is less than the ambient carbon dioxide concentration of the environment, such as below the approximately 390 ppm carbon dioxide concentration of the atmosphere, so that the released first product flue gas from the adsorption process may in net effect remove carbon dioxide from the atmosphere.

In one embodiment, the integrated adsorptive gas separation process may then comprise desorbing a first portion of the carbon dioxide component adsorbed on the at least one adsorbent material by heating the at least one adsorbent material. As noted above, in one embodiment, the desorption of adsorbed carbon dioxide may be primarily thermally driven as a TSA process, but may also be assisted by one or more secondary desorption mechanisms such as a pressure swing desorption, partial pressure desorption and/or purge desorption mechanism, for example. Then the process may comprise recovering a desorbed second product gas enriched in carbon dioxide from either the inlet or outlet end of the adsorbent contactor. Alternatively, the desorption of adsorbed carbon dioxide may be primarily driven by one or more of a pressure swing and/or partial pressure swing process, in combination or in place of a TSA process, for example.

In a preferred embodiment, only a portion of the adsorbed carbon dioxide is desorbed from the contactor and recovered in the second product gas, so that at least a portion of the carbon dioxide remains adsorbed on the adsorbent contactor. In a particular preferred embodiment, the desorbed portion of carbon dioxide recovered in the second product gas may comprise only about a third of the total adsorbed carbon dioxide, leaving about two thirds of the carbon dioxide component adsorbed on the adsorbent contactor at the end of the first desorption step. Therefore, because only a portion of the adsorbed carbon dioxide is desorbed in the first desorption step, the amount of heat energy required to desorb it is much reduced compared to processes where the majority or substantially all of the adsorbed carbon dioxide is desorbed. In a preferred embodiment, steam may be used to heat the adsorbent material and desorb the first portion of carbon dioxide such as by heating and/or displacement purge desorptive mechanisms, and accordingly, a significantly reduced amount of steam may desirably be required to desorb only about a third of the adsorbed carbon dioxide from the adsorbent contactor. In one such preferred embodiment, the desorbed second product gas desirably comprises substantially pure carbon dioxide, or in the case of steam being used to purge the adsorbent contactor during desorption, comprises substantially only carbon dioxide and steam. Accordingly, such second product gas is desirably highly concentrated in carbon dioxide and thereby suitable to be compressed efficiently (with condensation knockout of any steam component) for use and/or storage such as for carbon sequestration or other applications such as enhanced oil recovery purposes to reduce carbon emissions from the operation of the fuel combustor.

Following the first desorption, the integrated adsorptive gas separation process may comprise admitting ambient air or alternatively another suitable conditioning gas stream into the adsorbent contactor and desorbing a second portion of the carbon dioxide component adsorbed on the at least one adsorbent material in the contactor to recover a carbon dioxide enriched air or conditioning stream. In one embodiment, the desorption of the second portion of the carbon dioxide component may be driven by at least one of a TSA, PSA and PPSA desorption process. At least a portion of the carbon dioxide enriched air and/or conditioning stream is then recycled to the air inlet of the fuel combustor to pass through the combustor for combustion. In one such embodiment, the carbon dioxide enriched air stream may desirably have a higher carbon dioxide concentration than the ambient air, such as a carbon dioxide concentration above the about 400 ppm atmospheric carbon dioxide concentration, for example. In a preferred embodiment, the admitted ambient air may desirably be effective to desorb a majority, or more preferably, substantially all of the remaining carbon dioxide adsorbed on the adsorbent material, and to recycle the second portion of carbon dioxide into the combustion air intake of the fuel combustor.

A primary benefit of the recycling of the second portion of the adsorbed carbon dioxide to the intake of the fuel combustor is to increase the concentration of carbon dioxide in the post-combustion gas mixture which is admitted to the adsorptive gas separation system as the feed mixture, since the combustion gas will contain both the recycled carbon dioxide, as well as the carbon dioxide generated in the combustion process. Particularly in the case of fuel combustors where the baseline carbon dioxide content of the combustion gas mixture is relatively low, such as for gas turbines, and in an additional embodiment in some coal-fired thermal combustors, steam generators/boiler, process heaters, for example, such an increase in combustion gas carbon dioxide content may desirably increase the efficiency of the adsorptive separation of carbon dioxide in the adsorptive gas separation system compared to a non-recycled combustion gas mixture more dilute in carbon dioxide. Such increased efficiency of adsorptive carbon dioxide separation resulting from the increased carbon dioxide concentration in the combustion gas provided as a feed mixture in embodiments of the present invention may desirably allow for at least one of: decreased energy consumption for desorption of adsorbed carbon dioxide such as in the form of decreased steam or other purge fluid consumption or desorption heating; increased carbon dioxide purity in the desorbed second product gas enriched in carbon dioxide; reduced size and/or capital cost of the adsorptive separation system, and improved system recovery of carbon dioxide, for example.

In a particular embodiment, the desorption of the second portion of carbon dioxide is accomplished primarily by displacement purge by the ambient air and/or other conditioning stream, and in such a case the energy required for desorbing the carbon dioxide may be desirably small. Also, in one such preferred embodiment, the air and/or conditioning stream used to desorb the second portion of carbon dioxide may also desirably be cooled by the effect of the heat of desorption of the carbon dioxide, and therefore may be advantageously cooler and denser when recycled to the combustor air intake than available surrounding ambient air, which may desirably improve the efficiency of the fuel combustor, such as in the case where the fuel combustor operates at supra-atmospheric pressures, such as gas turbine combustors, where the combustion air is compressed before combustion, for example. In a further embodiment, the increased carbon dioxide in the combustor inlet mixture due to recycle of carbon dioxide from the adsorption system may desirably provide for an increased heat capacity of the inlet mixture relative to ambient inlet air. Such increased heat capacity of the combustor inlet mixture may desirably allow for a decrease in the non-combusted excess air portion of the inlet mixture which is required to maintain combustion temperatures below critical levels in fuel combustors such as gas turbines, for example, which may desirably increase efficiency of the gas turbine due to reduced inlet mass flow or enable increased fuel firing rate thereby increasing net power output, for example.

In an alternative embodiment where the fuel combustor operates at substantially atmospheric pressures, such as in coal-fired, steam generator/boiler, or process heater combustors, the air used to desorb the second portion of carbon dioxide may instead be heated by the comparatively hot adsorbent contactor and/or adsorbent material during the desorption step. In such case, the carbon dioxide enriched conditioning air stream recycled to the combustor air inlet may advantageously be heated above ambient air temperature, and may desirably improve the efficiency of the atmospheric fuel combustor.

In a further embodiment, in fuel combustors which include heat transfer or recovery from combustion flue gas, such as combined cycle gas turbines, thermal power plants, steam generators/boilers, process heaters, and the like, the increase in carbon dioxide concentration in the post-combustion flue gas due to recycling of a portion of the adsorbed carbon dioxide to the combustor inlet may also desirably increase the heat capacity of the post-combustion flue gas, due to the higher heat capacity of carbon dioxide compared to air. Such an increase in the heat capacity of the post-combustion flue gas may desirably allow for greater convective heat transfer efficiency in the heat transfer/recovery portion of the combustion system, such as in heat exchangers and/or heat recovery steam generator (HRSG) systems, for example.

In yet a further embodiment, in fuel combustors which include radiant heat transfer or recovery from combustion flue gas, such as steam generators/boilers, process heaters, and some thermal power plants and the like, the increase in carbon dioxide concentration in the post-combustion flue gas due to recycling of a portion of the adsorbed carbon dioxide to the combustor inlet may also desirably increase the radiant heat transfer capacity of the post-combustion flue gas, due to the IR emission spectrum of the increased concentration carbon dioxide component of the flue gas, relative to the negligible radiant heat transfer capacity of the air component of the flue gas. Such an increase in the radiant heat transfer capacity of the post-combustion flue gas may desirably allow for greater radiant heat recovery in the radiant zone of heat exchangers in such combustors, for example.

In another embodiment, the increase in carbon dioxide concentration in the post-combustion flue gas due to recycling of a portion of the adsorbed carbon dioxide to the combustor inlet may also desirably result in a lower adiabatic flame temperature of combustion relative to a lower carbon dioxide concentration inlet mixture, which may desirably result in reduced nitrogen oxide production in the combustion process. Such reduced nitrogen oxides in the combustion flue gas may be desirable to improve emissions quality and/or to reduce requirements for emission treatment systems, for example.

In another embodiment of the present invention, water vapor in the form of steam used in desorption of carbon dioxide from the adsorbent material may be provided for recycle to the combustor inlet mixture, such as for application to fuel combustors implementing water injection in the pre-combustion inlet mixture. In such an embodiment, requirements for water injection may be desirably decreased by such use of desorption water vapor recycled from the adsorption process, and/or recovery of water from steam purge desorption steps may be increased, for example. The present integrated adsorptive gas separation process according to the above embodiments may then desirably be repeated to provide for a continuous or repeated cyclic combustion gas separation method for separating a first portion of the carbon dioxide component from the combustion gas mixture, such as for carbon sequestration purposes. In particular, an adsorptive gas separation system for operation according to the present integrated gas separation method may desirably comprise two or more adsorbent contactors, so as to provide for staggered operation of the present integrated gas separation method and allow continuous and/or semi-continuous adsorptive separation from the combustion gas of the fuel combustor. In particular, an integrated adsorptive separation system may comprise three or more adsorbent contactors such that the first product fluid may be recovered from one contactor while the desorbed second product fluid is recovered from the second contactor, and the carbon dioxide enriched conditioning air stream is recovered from the third contactor. Any suitable mechanical arrangement may be implemented in the integrated adsorptive separation system to provide for and control the fluid flows required for implementation of the integrated gas separation process of the present embodiment, such as an adsorptive separation system using mechanical/pneumatic or other types of valves or other flow control devices for example to implement the fluid flows of the steps of the present TSA and/or PPSA and/or PSA adsorption process, as are known in the art for systems comprising one, two, or three or more adsorbers containing adsorbent material. In a particular embodiment, a rotary wheel or rotor mechanical arrangement where the adsorbers containing adsorbent material are located in the rotating component may be implemented to provide for and control the fluid flows required to implement the integrated gas separation process of the invention, such as may be similar to those used in a rotary enthalpy or other adsorbent wheel, for example.

In a particular embodiment, the one or more adsorbent contactors may comprise parallel passage adsorbent contactors. In such an embodiment, suitable such parallel passage adsorbent contactors may comprise a plurality of substantially parallel fluid flow passages oriented in a first axial direction between an inlet and outlet end of the contactor in order to permit fluid to flow through the contactor, and cell walls which comprise at least one adsorbent material situated between and separating the fluid flow passages. The parallel passage adsorbent contactor may also desirably comprise a plurality of axially continuous thermally conductive filaments oriented in the axial direction of the contactor and in direct contact with the at least one adsorbent material comprised in or on the cell walls of the contactor. Certain such parallel passage adsorbent contactor structures which may be suitable for use in implementing the integrated combustion gas separation process according to an embodiment of the present invention are described in the applicant's co-pending PCT international patent application filed as PCT/CA2010/000251 on Feb. 26, 2010, the contents of which are herein incorporated by reference as though they had formed part of this application as presently filed.

FIG. 1 illustrates a schematic view of an exemplary integrated adsorptive gas separation system 10 for separation of combustion gases from a gas turbine 30 for use in accordance with an embodiment of the present invention. In one embodiment, the integrated adsorptive gas separation system 10 may be used for implementing the present integrated combustion gas separation process described above. The system 10 comprises a gas turbine 30, such as a natural gas power generation turbine, for example. Turbine 30 comprises an air inlet 36 for admitting air into the turbine 30 for admixture with fuel 32 in a combustion chamber to produce a combustion gas or flue gas mixture comprising at least carbon dioxide and nitrogen components which is exhausted from the turbine 30.

In a preferred embodiment of the integrated adsorptive gas separation system 10, gas turbine 30 is a combined cycle gas turbine (CCGT) and also comprises a heat recovery steam generator (HRSG) 40 which receives combustion gas from the turbine 30 and raises steam which is expanded over one or more heat recovery expansion turbines to recover heat energy and generator power. Following such use in the HRSG 40 to generate steam, combustion gas exits the HRSG 40 from combustion gas outlet 41. In one such embodiment, the HRSG 40 may also comprise a low pressure steam outlet 48 for supplying low pressure steam to an inlet 25 of adsorptive gas separation system 20. In another preferred embodiment, the integrated adsorptive gas separation system 10 also comprises a cooler 50 such as a direct contact cooler 50 which receives combustion gas from the outlet 41 of the HRSG 40 and cools the combustion gas for use as a feed mixture to inlet 24 of the adsorptive gas separation system 20.

Adsorptive gas separation system 20 comprises one or more adsorptive contactors, each comprising at least one suitable adsorbent material. In a preferred embodiment, separation system 20 may comprise at least three adsorptive contactors 21, 22 and 23. In one embodiment, a first contactor 21 may receive cooled combustion gas mixture at inlet 24, for adsorption of the carbon dioxide component of the combustion gas on the adsorbent material of contactor 21, to recover a first product gas, desirably depleted of carbon dioxide from outlet 29. In one such embodiment, the first product gas may comprise flue gas substantially free of carbon dioxide, such as for release to the environment. A second contactor 22 may desorb a first portion of adsorbed carbon dioxide by heating of the adsorbent material, such as by admission of low pressure steam through inlet 25, to recover a second product gas stream desirably enriched in carbon dioxide through outlet 28. In one embodiment, the second product gas stream may comprise substantially pure carbon dioxide and/or carbon dioxide and steam (or other suitable purge fluid), which may be efficiently compressed such as for use and/or storage such as for carbon sequestration or alternate use in enhanced oil recovery, for example. A third contactor 23 may receive an air purge stream through inlet 26 such as to desorb a second portion of carbon dioxide from the adsorbent material in the contactor 23, to recover a recycle conditioning air stream enriched in carbon dioxide through outlet 27, for recycle to the inlet 36 of gas turbine 30 to be used as a portion of the combustion air passing into turbine 30 for combustion.

In such an embodiment, the first adsorber 21 preferably adsorbs substantially all of the carbon dioxide component of the combustion gas entering inlet 24, resulting in a first product gas recovered from outlet 29 that is substantially free of carbon dioxide. Further, in a preferred embodiment, the first portion of carbon dioxide desorbed from second contactor 22 may desirably comprise no more than half of the total carbon dioxide adsorbed from the combustion gas, and more desirably may comprise about one third of the total adsorbed carbon dioxide. Accordingly, then, the second portion of carbon dioxide desorbed from third contactor 23 may desirably comprise no less than half of the total carbon dioxide adsorbed from the combustion gas, and more preferably about two thirds of the total adsorbed carbon dioxide. In such preferred embodiments, the desorption and recycle of preferably no less than half, and more preferably about two thirds of the total adsorbed carbon dioxide back to the inlet 36 of gas turbine 30 may advantageously increase the concentration of carbon dioxide in the combustion gas delivered to the gas separation system 20, thereby increasing the efficiency of carbon dioxide adsorption in first contactor 21 and also increase the efficiency of desorption of the first portion of carbon dioxide in second contactor 22, thereby increasing the energy efficiency of the gas separation system 20 and decreasing the cost of producing first and second product gases depleted and enriched in carbon dioxide, respectively. Further, the recycle of carbon dioxide and air back to the turbine intake 36 may also have the benefit of reducing the temperature of the recycled intake gas, due to the decrease in temperature of the intake gas from the heat of desorption of the second portion of carbon dioxide, thereby increasing the efficiency of the gas turbine 30. Also, in one embodiment, the efficiency of the compression stage of the turbine 30 may also be desirably increased due to the increased heat capacity of carbon dioxide relative to air in the recycled portion of the air flowing into turbine intake 36.

Figure 2:
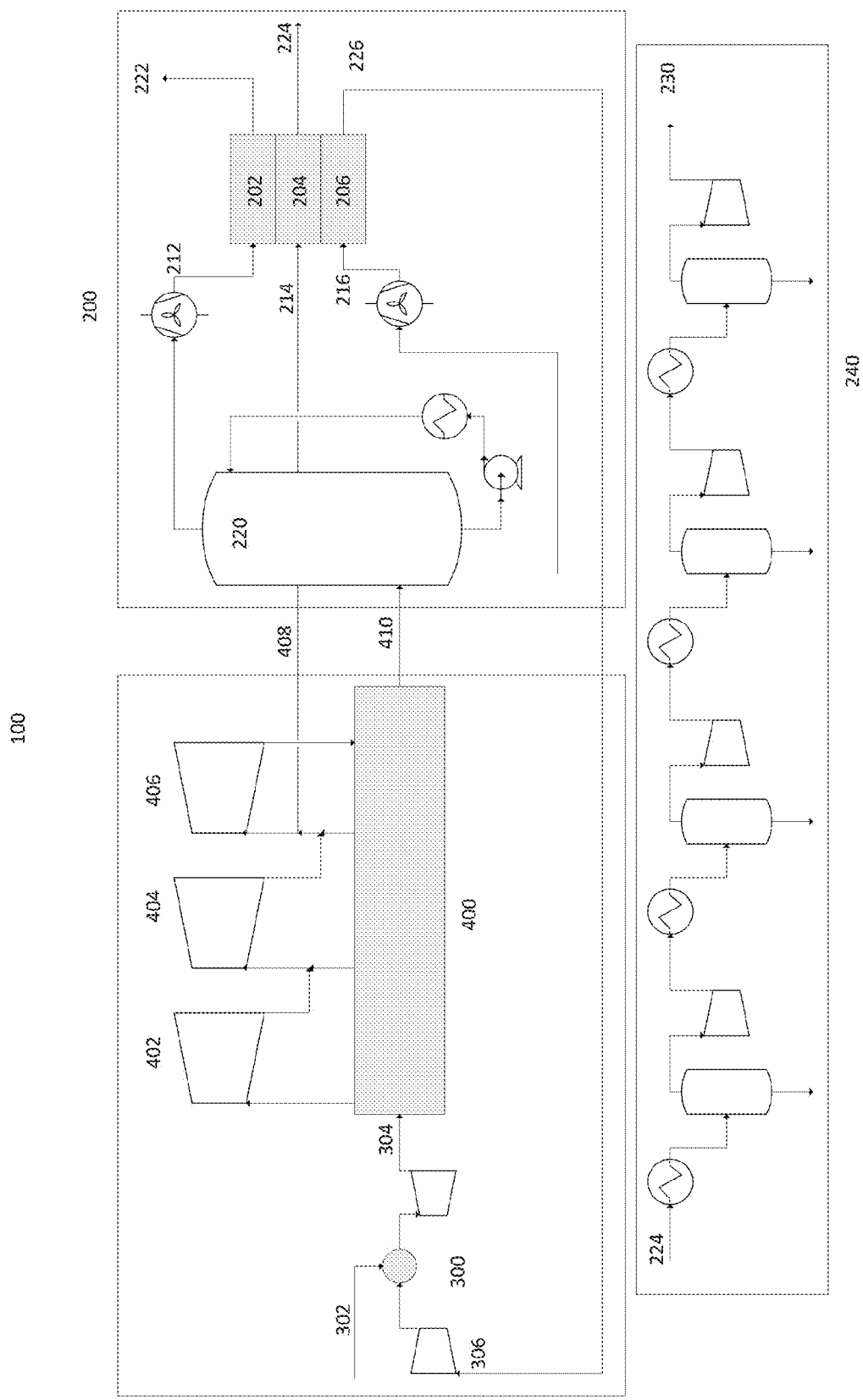
FIG. 2 illustrates a further schematic view of an integrated adsorptive gas separation system for separation of combustion gases from a gas turbine for use in accordance with an embodiment of the invention.
Figure 3:
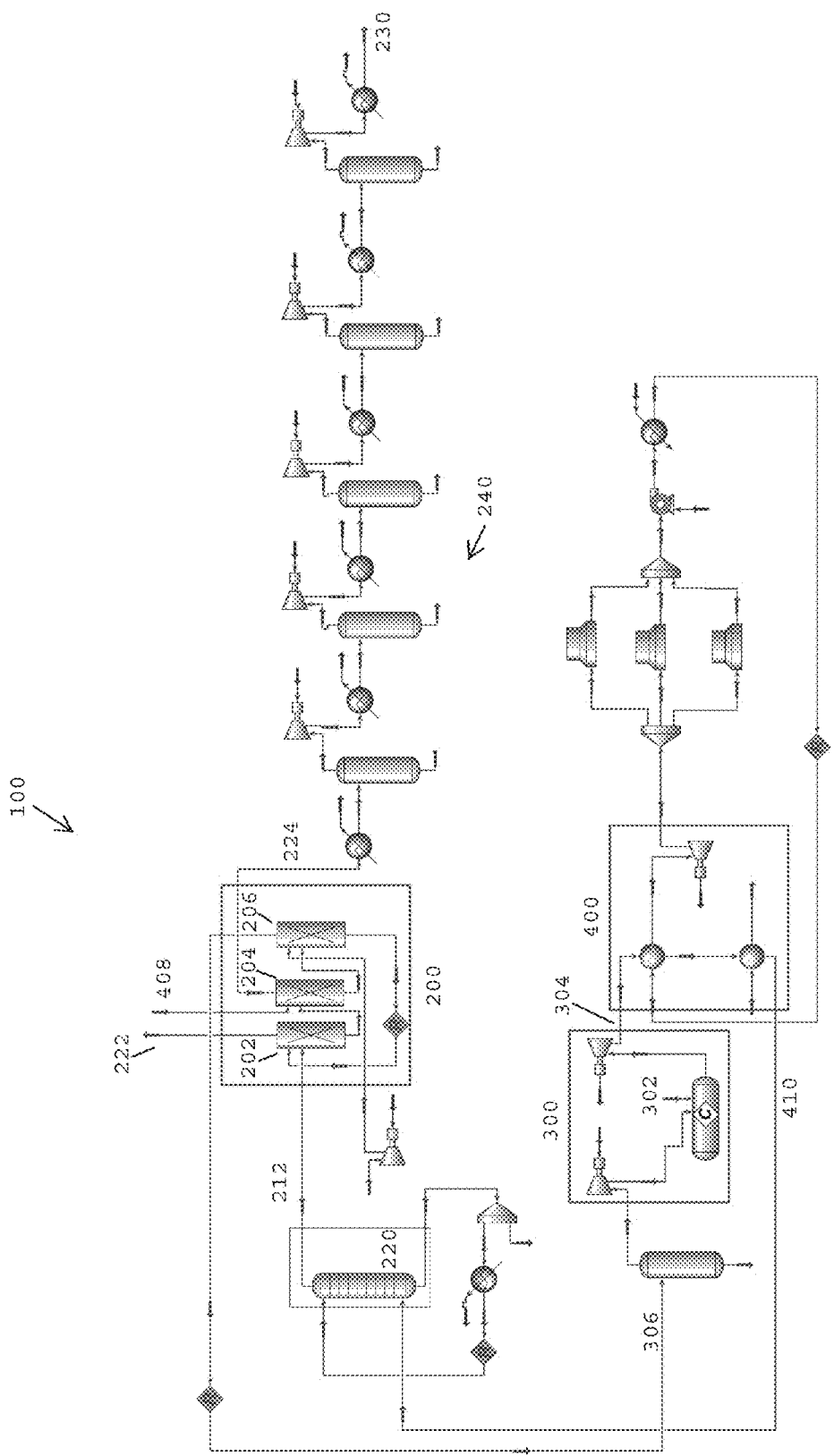
FIG. 3 illustrates yet a further schematic view of an integrated adsorptive gas separation system for separation of combustion gases from a gas turbine for use in accordance with an embodiment of the invention.

FIGS. 2 and 3 illustrates further schematic views of an exemplary integrated adsorptive gas separation system 100 for separation of combustion gases from a gas turbine 300 for use in accordance with embodiments of the present invention. In one embodiment, the integrated adsorptive gas separation system 100 may be used for implementing the present integrated combustion gas separation process described above, similar to the gas separation system illustrated in FIG. 1. The system 100 comprises a gas turbine 300, such as a natural gas power generation turbine, suitable examples of which may include natural gas power generation turbines manufactured by General Electric Company, of Schenectady, N.Y., USA, for example. Turbine 300 comprises an air inlet 306 for admitting air into the turbine 300 for admixture with fuel 302 (typically natural gas comprising primarily methane, but may include any other suitable gaseous, vapor, liquid, or airborne combustible fuel) in a combustion chamber to produce a combustion gas or flue gas mixture comprising at least carbon dioxide and nitrogen components which is exhausted from the turbine 300, through turbine combustion gas exhaust outlet 304.

In a preferred embodiment of the integrated adsorptive gas separation system 100, gas turbine 300 is a combined cycle gas turbine (CCGT) and also comprises a heat recovery steam generator (HRSG) 400 which receives combustion gas from exhaust outlet 304 of the turbine 300 and uses the heat of the combustion gas exhaust to raise steam which is expanded over multiple heat recovery expansion steam turbines to recover heat energy and generator power. In the present embodiment, HRSG may desirably comprise high temperature steam turbine 402, intermediate pressure steam turbine 404 and low pressure steam turbine 406 operating sequentially so as to extract energy from the steam raised by cooling the combustion gas exhaust from turbine 300. Following such use in the HRSG 400 to generate steam, combustion gas exits the HRSG 400 from combustion gas outlet 410. In one such embodiment, the HRSG 400 may also comprise a low pressure steam outlet 408 for supplying low pressure steam from the outlet of low pressure steam turbine 406 to an inlet 214 of adsorptive gas separation system 200. In another preferred embodiment, the integrated adsorptive gas separation system 100 also comprises a combustion gas cooler 220 such as a direct contact combustion gas cooler 220 which receives combustion gas from the outlet 410 of the HRSG 400 and cools the combustion gas for use as a feed mixture to inlet 212 of the adsorptive gas separation system 200.

Adsorptive gas separation system 200 comprises one or more adsorptive contactors, each comprising at least one suitable adsorbent material. In a preferred embodiment, separation system 200 may comprise at least three adsorptive contactors 202, 204 and 206. In one embodiment, an exemplary first contactor 202, which in a preferred embodiment may comprise a parallel passage adsorbent contactor 202 may receive cooled combustion gas mixture at inlet 212, for adsorption of the carbon dioxide component of the combustion gas on the adsorbent material of contactor 202, to recover a first product gas, desirably depleted of carbon dioxide, from outlet 222. In one such embodiment, the first product gas may desirably comprise combustion flue gas substantially free of carbon dioxide, such as for release to the environment. A second contactor 204 may desorb a first portion of adsorbed carbon dioxide from the adsorbent material, such as by heating of the adsorbent material. In one such embodiment, the first portion of carbon dioxide may be desorbed by heating the adsorbent material through the admission of low pressure steam through inlet 214, to recover a second product gas stream desirably enriched in carbon dioxide through outlet 224. In another such embodiment, an alternative or additional source of heat for heating the adsorbent material to desorb the first portion of carbon dioxide may be provided by heated combustion flue gas, such as sourced from downstream from the gas turbine 300, for example. In one embodiment, the second product gas stream may comprise substantially pure carbon dioxide and/or carbon dioxide and steam (or other suitable purge fluid), which may be desirably be suitable to be efficiently compressed such as for use and/or storage such as for carbon sequestration or alternate use in enhanced oil recovery, for example. A third contactor 206 may receive an air purge stream through inlet 216 such as to desorb a second portion of carbon dioxide from the adsorbent material in the contactor 206, to recover a recycle conditioning air stream enriched in carbon dioxide through outlet 226, for recycle to the inlet 306 of gas turbine 300 to be used as at least a portion of the combustion air passing into turbine 300 for combustion.

In such an embodiment, the first adsorbent contactor 202 preferably adsorbs substantially all of the carbon dioxide component of the combustion gas entering inlet 212, resulting in a first product gas recovered from outlet 222 that is substantially free of carbon dioxide. Further, in a preferred embodiment, the first portion of carbon dioxide desorbed from second contactor 204 may desirably comprise no more than half of the total carbon dioxide adsorbed from the combustion gas, and more desirably may comprise about one third of the total adsorbed carbon dioxide. Accordingly, then, the second portion of carbon dioxide desorbed from third contactor 206 may desirably comprise no less than half of the total carbon dioxide adsorbed from the combustion gas, and more preferably about two thirds of the total adsorbed carbon dioxide. In such preferred embodiments, the desorption and recycle of preferably no less than half, and more preferably about two thirds of the total adsorbed carbon dioxide back to the inlet 306 of gas turbine 300 may advantageously increase the concentration of carbon dioxide in the combustion gas delivered to the gas separation system 200, thereby increasing the efficiency of carbon dioxide adsorption in first contactor 202 and also increase the efficiency of desorption of the first portion of carbon dioxide in second contactor 204, thereby increasing the energy efficiency of the gas separation system 200 and decreasing the cost of producing first and second product gases depleted and enriched in carbon dioxide, respectively. Further, the recycle of carbon dioxide and air back to the turbine intake 306 may also have the benefit of reducing the temperature of the recycled intake gas, due to the decrease in temperature of the intake gas from the heat of desorption of the second portion of carbon dioxide, thereby increasing the efficiency of the gas turbine 300. Also, in one embodiment, the efficiency of the compression stage of the turbine 300 may also be desirably increased due to the increased heat capacity of carbon dioxide relative to air in the recycled portion of the air flowing into turbine intake 306 from the adsorptive gas separation system 200.

In one embodiment of the above-noted invention, the second produce gas recovered from outlet 224 of the gas separation system 200 and enriched in carbon dioxide may desirably be fluidly connected to a carbon dioxide compression train system 240. The carbon dioxide compression train 240 may desirably be suitable to compress the carbon dioxide rich second product gas, such as through a series of sequential compression stages, to provide a highly pressurized and/or liquefied concentrated carbon dioxide product gas 230 such as for export to other industrial and/or sequestration uses, such as sequestered storage and/or enhanced oil recovery, for example.

In a particular embodiment of the present invention adapted to adsorptive gas separation of combustion gas from a combined cycle natural gas power generation turbine, the adsorptive gas separation system may desirably separate about one third of the carbon dioxide from the gas turbine combustion gas into the carbon dioxide rich first product gas, such that about two thirds of the carbon dioxide from the turbine combustion gas is recycled back to the gas turbine intake in the recycle conditioning air stream. In one such embodiment comprising approximately two thirds recycle of carbon dioxide, the carbon dioxide concentration of the turbine combustion gas may be desirably controlled to be about 12% carbon dioxide, wherein approximately 4% of the 12% carbon dioxide content is removed in the carbon dioxide rich second product gas (such as for sequestration and/or industrial use, for example) and approximately 8% of the 12% carbon dioxide content is recycled back to the intake of the turbine. In alternative embodiments, the carbon dioxide concentration of the turbine combustion gas may be desirably controlled to be substantially higher than 12% carbon dioxide, such as up to about 50% carbon dioxide for example in turbines which are suitably configured for such carbon dioxide concentrations, such as may be additionally advantageous to further increase efficiency of adsorptive separation of carbon dioxide in the adsorption system, and/or increase efficiency of turbine combustion and/or heat recovery processes, for example.

Figure 4:
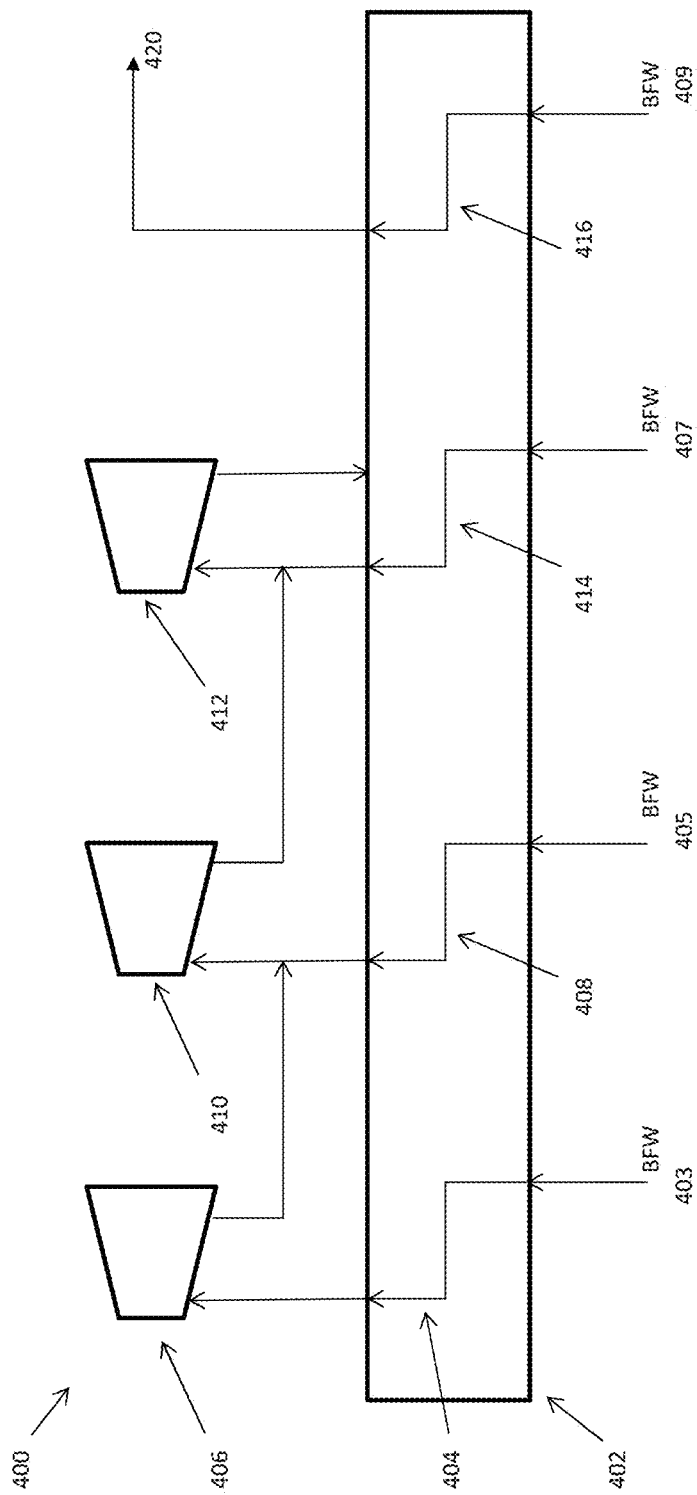
FIG. 4 illustrates a schematic view of an integrated adsorptive gas separation system for separation of combustion gases from a fossil fuel combustion process comprising a heat recovery steam generator (HRSG) comprising a steam loop for use in the gas separation system in accordance with a further embodiment of the invention.

FIG. 4 illustrates a schematic view of a portion of an integrated adsorptive gas separation system 400 for separation of combustion gases from a fossil fuel combustion process comprising a heat recovery steam generator (HRSG) 402 according to an embodiment of the present invention. The HRSG 402 of the system of FIG. 4 comprises three exemplary heat recovery steam generation and expansion low loops including a high pressure steam loop 404 receiving boiler feed water (BFW) 403 at a first high pressure, and passing steam generated through high pressure expander 406 to capture additional energy from the combustor flue gas. HRSG 402 also similarly comprises medium steam loop 408 receiving BFW from source 405 at a medium pressure, and recovering energy from passing the steam through medium pressure expander 410. Also similarly, HRSG 402 further comprises a low pressure steam loop 414 receiving BFW from source 407 and passing generated steam through low pressure expander 412.

HRSG 402 additionally comprises an auxiliary very low pressure loop 416 which receives BFW from source 409 at a very low pressure. In the particular embodiment shown in FIG. 4, the steam generated in very low pressure loop 416 may desirably be supplied to the adsorption separation system (not show) such as through very low pressure steam outlet 420, without passing through an expansion step following loop 416. In such an embodiment, the lowest pressure steam loop 416 may desirably be configured to provide a supply of steam at a relatively lower pressure than the rest of the HRSG 402, such as may be suitable only for low pressure use in the adsorptive gas separation system (not shown) which preferably operates at substantially ambient pressure or only slightly above, for example. The lowest pressure steam provided from the exemplary lowest pressure steam loop 416 may desirably be used to provide a steam purge fluid such as for use in desorption of carbon dioxide from the adsorbers of the adsorptive separation system, such as for desorption of a carbon dioxide enriched product gas and/or for recycle to the inlet of the fuel combustor for combustion, as described above in reference to other embodiments of the invention.

In such an embodiment, the generation and use of very low pressure steam from lowest pressure steam loop 416 for desorbing adsorbed gas such as carbon dioxide from the adsorbers of the gas separation system may desirably consume less energy in the generation of such steam in the auxiliary lowest pressure loop 416, compared with an embodiment where such purge fluid steam was generated in another higher pressure loop of the HRSG 402, such as at an elevated pressure level within the common existing high, medium or low pressure steam generation loopsin a conventional HRSG, for example. In a conventional such HRSG, a source for steam to be used for desorption in the gas separation system may for example receive steam from a conventional low pressure steam loop 414, which may undesirably reduce the steam available to use in for expansion in a low pressure expander 412, for example.

In an alternative aspect according to the present invention, the integrated adsorptive gas separation process according to an embodiment of the invention may comprise a temperature swing adsorption (TSA) process particularly directed to separating carbon dioxide gas from a combustion gas feed mixture from a fuel combustor, where in the combustion gas mixture comprises at least carbon dioxide and nitrogen components. In one such embodiment, the TSA process for separating carbon dioxide may be adapted for removing at least a portion of carbon dioxide from the combustion gas or exhaust of a thermal power plant, such as a coal or natural gas power plant for example, or from a steam generator/boiler or process heater. In such embodiments, the removal of only a portion of the carbon dioxide content of the combustion gas to be recovered in the second product gas may desirably have the advantage of increasing the concentration of carbon dioxide in the combustion gas exiting from the fuel combustor, such that carbon dioxide from the combustion gas in the adsorptive gas separation system may be more efficiently adsorptively separated such as by a TSA process. In another optional embodiment, the adsorptive carbon dioxide gas separation process may be based primarily on a pressure swing and/or a partial pressure swing/displacement purge adsorption process, such as described above in reference to other embodiments where TSA is not the primary adsorptive process but may comprise a secondary adsorptive driver, for example.

In one embodiment of the present invention, a TSA (or alternatively a PSA and/or PPSA) carbon dioxide separation process may desirably be repeated in each of multiple parallel passage adsorbent contactors in the adsorptive gas separation system to provide for a continuous or repeated cyclic separation method for separating a portion of the carbon dioxide from the combustion gas feed mixture, while recycling a portion of the carbon dioxide to the air inlet of the fuel combustor. In particular, similar to as described above in other embodiments, an adsorptive gas separation system for operation according to an embodiment of the present invention may desirably comprise two or more such parallel passage adsorbent contactors, so as to provide for staggered operation of a suitable TSA (or alternatively a PSA and/or PPSA) separation process and allow continuous and/or semi-continuous adsorptive separation from a source of fuel combustor source of combustion gas. As described above, any suitable known adsorptive separation system using mechanical/pneumatic or other types of valves or other flow control devices for example may be used to implement the gas flows of the steps of the present TSA (or alternatively a PSA and/or PPSA) process, as are known in the art for systems comprising one, two, or three or more adsorbers containing adsorbent material.

Similar to as described above, in one embodiment of the present invention, an adsorptive gas separation system suitable for implementing the carbon dioxide separation process comprises at least one parallel passage adsorbent contactor which each comprise a plurality of substantially parallel fluid flow passages oriented in a first axial direction between and inlet and outlet end of the contactor in order to permit gas to flow through the contactor, and cell walls which comprise at least one carbon dioxide selective adsorbent material situated between and separating the fluid flow passages. Each suitable such parallel passage adsorbent contactor further comprises a plurality of axially continuous thermally conductive filaments oriented in the axial direction of the contactor and in direct contact with the at least one carbon dioxide adsorbent material comprised in the cell walls of the contactor. As described above, certain such parallel passage adsorbent contactor structures which may be suitable for use in implementing a TSA carbon dioxide separation process according to an embodiment of the present invention are described in the applicant's co-pending PCT international patent application filed as PCT/CA2010/000251, the contents of which are herein incorporated by reference as though they had formed part of this application as originally filed. In another optional embodiment, the adsorptive gas separation system may be suitable for implementing a carbon dioxide separation process based primarily on a pressure swing and/or a partial pressure swing/displacement purge adsorption process, such as described above in reference to other embodiments where TSA is not the primary adsorptive process but may comprise a secondary adsorptive driver, for example.

In certain embodiments of the present integrated adsorptive combustion gas separation process, any suitable known carbon dioxide adsorbent material may be used in the adsorbent contactor(s) of the adsorptive separation system to adsorb carbon dioxide during the adsorption step of the process. Potentially suitable such carbon dioxide adsorbents may comprise, but are not limited to: activated carbon adsorbent, amine impregnated adsorbent supports (comprising silica, activated carbon, alumina, zeolite, polymer and ceramic supports), metal salt, metal hydroxide, metal oxide, zeolite, hydrotalcite, silicalite, metal organic framework and zeolitic imadazolate framework adsorbent materials, and combinations thereof. In a particular embodiment, a suitable carbon dioxide adsorbent material may be selected that may also desirably be selective for the adsorption of carbon dioxide over any other gas components of the combustion gas feed mixture, for example.

Similar to as described above in other embodiments, in one embodiment of the present invention, the steps of a TSA (or alternatively or in combination with a PPSA) carbon dioxide gas separation process may be desirably conducted under substantially constant or isobaric pressure conditions. In a particular embodiment, the admission of the combustion gas feed mixture to the adsorbent contactor, adsorption of carbon dioxide, recovery of a flue gas product stream, desorption of a portion of carbon dioxide as a carbon dioxide second product stream, and recovery of a second desorbed portion of carbon dioxide in a recycle air conditioning stream may all be conducted under substantially atmospheric pressure, for example. In an alternative embodiment, such steps of the present TSA (or alternatively or in combination with a PPSA) process may be conducted at a substantially constant elevated pressure, such as under isobaric super-atmospheric conditions, for example. In another alternative embodiment, the admitting, adsorbing and recovering a flue gas product stream steps of the present TSA (or alternatively or in combination with a PPSA) process may be conducted under a first substantially constant pressure condition, such as under atmospheric pressure, for example, while the desorbing and recovering a desorbed carbon dioxide second product steps may be conducted at an elevated pressure, such as an elevated super-atmospheric pressure. In one such embodiment, the adsorbent contactor may be substantially sealed prior to the desorbing step, and the heating of the adsorbent contactor conducted during the desorbing step may result in increased pressure within the contactor as the adsorbed carbon dioxide desorbs from the adsorbent material, thereby raising the pressure of the contactor to a super-atmospheric level, for example. In this way the desorbed carbon dioxide product fluid may optionally be recovered at a desirably elevated pressure above the pressure at which the adsorbing steps were conducted, so as to provide a pressurized carbon dioxide second product stream which may be desirable in certain applications, such as where further compression of the carbon dioxide may be required for transport, storage, sequestration or industrial use.

In another optional embodiment, the adsorptive gas separation system may receive combustion gas from the fuel combustor (such as from the exhaust of the HRSG for a combined cycle gas turbine, or from the turbine exhaust for a gas turbine without HRSG) at a pressure elevated above ambient pressure such as to provide sufficient pressure to supply and drive the combustion gas through the separation system, for example. In one such embodiment, the combustion gas may be provided to the gas separation system at a suitable super-atmospheric pressure such as approximately 10 kPa above ambient pressure, for example. In a particular such embodiment, the provision of combustion gas at a sufficiently elevated pressure to provide for driving the combustion gas through the separation system may desirably allow for removal of auxiliary equipment such as a draft fan or other compressive equipment associated with the gas separation system for moving combustion gas through the separation system, for example, which may desirably reduce energy consumption of the integrated gas separation system and fuel combustor.

Further optional embodiments of the present inventive integrated adsorptive gas separation process and system particularly adapted for integration with a natural gas combined cycle gas turbine power generator are contemplated which comprise at least partial recycle of adsorbed carbon dioxide from the combustion gas stream back into the intake air of the gas turbine, as may be envisioned with other gas separation techniques which may be known in the art.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. An integrated adsorptive gas separation process for separating at least a portion of a combustion gas mixture from a fuel combustor, said combustion gas mixture comprising at least a first component comprising carbon dioxide and a second component, the process comprising:
   admitting said combustion gas mixture into an adsorptive gas separation system comprising at least one adsorbent material;
   adsorbing at least a portion of said first component on at least one said adsorbent material;
   recovering a first product gas depleted in said first component relative to said combustion gas mixture from an outlet end of said adsorptive gas separation system;
   desorbing a first portion of said first component adsorbed on at least one said adsorbent material;
   recovering a desorbed second product gas enriched in said first component from at least one of said inlet and outlet ends of said adsorptive gas separation system;
   admitting a conditioning fluid into said adsorptive gas separation system and desorbing a second portion of said first component adsorbed on at least one said adsorbent material to recover a first component enriched conditioning stream; and
   recycling at least a portion of said first component enriched conditioning stream recovered from said adsorptive gas separation system to an air inlet of said fuel combustor to pass through said fuel combustor for combustion.

2. The integrated adsorptive gas separation process according to claim 1, wherein said desorbing a first portion of said first component comprises desorbing a first portion of said first component adsorbed on at least one said adsorbent material by at least one of:
   thermal swing desorption by heating at least one said adsorbent material;
   pressure swing desorption; and
   partial pressure swing desorption.

3. The integrated adsorptive gas separation process according to claim 1, wherein said fuel combustor comprises at least one of a gaseous fuel, liquid fuel and solid fuel fired combustor.

4. The integrated adsorptive gas separation process according to claim 1, wherein said fuel combustor comprises at least one of:
   a combined cycle gas turbine combustor;
   a gas turbine combustor;
   a coal-fired thermal combustor;
   a steam generator or boiler combustor; and
   a process heater combustor.

5. The integrated adsorptive gas separation process according to claim 1, wherein said combustion gas mixture comprises about 12% carbon dioxide, and wherein said first portion of said first component comprises about 4% of said combustion gas mixture, and said second portion of said first component recycled to said combustor comprises about 8% of said combustion gas mixture.

6. The integrated adsorptive gas separation process according to claim 1, wherein said first product gas is substantially free of said first component, and said desorbed second product gas consists substantially of said first component.

7. The integrated adsorptive gas separation process according to claim 1, wherein said adsorptive gas separation system comprises at least one parallel passage adsorbent contactor, said parallel passage adsorbent contactor comprising:
   a plurality of substantially parallel fluid flow passages oriented in a first axial direction between an inlet and an outlet end thereof; and
   cell walls situated between said fluid flow passages comprising at least one adsorbent material.

8. The integrated adsorptive gas separation process according to claim 7, wherein said at least one adsorbent contactor additionally comprises a plurality of axially continuous thermally conductive filaments oriented in said first axial direction and in direct contact with said at least one adsorbent material, and said process additionally comprising transferring heat along at least a portion of said thermally conductive filaments in either of said first axial direction or a second axial direction to provide at least a portion of the heat of desorption of said first component during said desorbing step.

9. The integrated adsorptive gas separation process according to claim 1 wherein said process comprises a thermal swing adsorptive gas separation process, and said adsorbing further comprises adsorbing at least a portion of said first component on said at least one adsorbent material at a first adsorbent material temperature, and said desorbing further comprises desorbing at least a portion of said first component adsorbed on said at least one adsorbent material by heating said adsorbent material at a second adsorbent material temperature.

10. The integrated adsorptive gas separation process according to claim 1 wherein said process comprises a thermal swing adsorptive gas separation process and wherein said desorbing additionally comprises heating said at least one adsorbent material using a heated process fluid admitted into said adsorptive gas separation system, wherein said heated process fluid comprises at least one of: steam, combustion flue gas, and carbon dioxide.

11. The integrated adsorptive gas separation process according to claim 1 wherein said process comprises a pressure swing adsorptive gas separation process, and said adsorbing further comprises adsorbing at least a portion of said first component on said at least one adsorbent material at a first pressure, and said desorbing further comprises desorbing at least a portion of said first component adsorbed on said at least one adsorbent material at a second pressure lower than said first pressure.

12. The integrated adsorptive gas separation process according to claim 1 wherein said process comprises a partial pressure swing adsorptive gas separation process, and said adsorbing further comprises adsorbing at least a portion of said first component on said at least one adsorbent material at a first partial pressure, and said desorbing further comprises desorbing at least a portion of said first component adsorbed on said at least one adsorbent material at a second partial pressure lower than said first partial pressure.

13. The integrated adsorptive gas separation process according to claim 8, wherein said process comprises a thermal swing adsorptive gas separation process, and wherein said desorbing additionally comprises directly heating at least one said adsorbent material by supplying thermal energy to said thermally conductive filaments to directly heat said cell walls comprising said at least one adsorbent material.

14. The integrated adsorptive gas separation process according to claim 1, wherein said at least one adsorbent material is selected from the list consisting of: activated carbon adsorbent, amine impregnated adsorbent supports (comprising silica, activated carbon, alumina, zeolite, polymer and ceramic supports), metal salt, metal hydroxide, metal oxide, zeolite, hydrotalcite, silicalite, metal organic framework and zeolitic imadazolate framework adsorbent materials, and combinations thereof.

15. The integrated adsorptive gas separation process according to claim 1, wherein said admitting, adsorbing, and recovering a first product fluid are conducted at substantially atmospheric pressure, and wherein said desorbing and recovering a desorbed second product fluid steps are conducted at at least one of substantially atmospheric and elevated supra-atmospheric pressures.

16. The integrated adsorptive gas separation process according to claim 1, wherein said first component enriched conditioning stream is at least one of heated and cooled by contact with an adsorbent contactor of said adsorbent gas separation system during said desorbing of said second portion of said first component adsorbed on said at least one said adsorbent material.

17. The integrated adsorptive gas separation process according to claim 1, wherein said first component enriched conditioning stream is enriched in carbon dioxide relative to an ambient carbon dioxide concentration in said air and a carbon dioxide concentration of said first product gas depleted in said first component is less than an ambient carbon dioxide concentration of said air.

18. An integrated adsorptive gas separation system for separating at least a portion of a combustion gas mixture, said combustion gas mixture comprising at least a first component comprising carbon dioxide and a second component, the system comprising:
a fuel combustor comprising a combustor air inlet, a combustion chamber and a combustion gas outlet, wherein said combustion gas comprises at least first and second components;
an adsorptive gas separator comprising an inlet and an outlet end, wherein said adsorptive gas separator is fluidly connected to said fuel combustor to receive said combustion gas as a feed gas mixture into said inlet end and to adsorb at least a portion of said first component onto at least one adsorbent material comprised in said adsorbent gas separator; and
a combustion gas recycle fluid conduit which is fluidly connected to said adsorptive gas separator and to said combustor air inlet, and adapted to receive a desorbed combustion recycle gas comprising at least a portion of said first component adsorbed on said adsorbent material, and to return said desorbed combustion recycle gas to said combustor air inlet.

19. The integrated adsorptive gas separation system according to claim 18, wherein said adsorptive gas separator additionally comprises a plurality of axially continuous thermally conductive filaments oriented in said axial direction and in direct contact with said at least one adsorbent material and wherein said at least one adsorbent material is selected from the list consisting of: activated carbon adsorbent, amine impregnated adsorbent supports (comprising silica, activated carbon, alumina, zeolite, polymer and ceramic supports), metal salt, metal hydroxide, metal oxide, zeolite, hydrotalcite, silicalite, metal organic framework and zeolitic imadazolate framework adsorbent materials, and combinations thereof.

20. The integrated adsorptive gas separation system according to claim 18, wherein said fuel combustor comprises at least one of:
a combined cycle gas turbine combustor;
a gas turbine combustor;
a coal-fired thermal combustor;
a steam generator or boiler combustor; and
a process heater combustor.

* * * * *